(12) United States Patent
Kumar

(10) Patent No.: US 12,499,158 B2
(45) Date of Patent: Dec. 16, 2025

(54) LARGE LANGUAGE MACHINE LEARNING MODEL QUERY MANAGEMENT

(71) Applicant: Oracle International Corporation, Redwood Shores, CA (US)

(72) Inventor: Vivek Kumar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/812,123

(22) Filed: Aug. 22, 2024

(65) Prior Publication Data

US 2025/0086235 A1  Mar. 13, 2025

Related U.S. Application Data

(60) Provisional application No. 63/582,171, filed on Sep. 12, 2023.

(51) Int. Cl.
*G06F 16/2453* (2019.01)
*G06F 16/9032* (2019.01)
*G06N 3/0475* (2023.01)

(52) U.S. Cl.
CPC ..... *G06F 16/90332* (2019.01); *G06N 3/0475* (2023.01)

(58) Field of Classification Search
None
See application file for complete search history.

(56) References Cited

U.S. PATENT DOCUMENTS

| | | | | |
|---|---|---|---|---|
| 2024/0070270 A1* | 2/2024 | Mace | ...................... | G06F 21/554 |
| 2024/0184812 A1* | 6/2024 | McDaniel | ............... | G06F 40/30 |
| 2024/0184991 A1* | 6/2024 | Mahabaleshwarkar | ...................... | |
| | | | | G06F 40/35 |
| 2024/0248920 A1* | 7/2024 | Qiao | ................... | G06F 16/3329 |
| 2024/0362417 A1* | 10/2024 | Imani | ....................... | G06N 3/09 |

OTHER PUBLICATIONS

"Building and Deploying Generative AI Models with NVIDIA NeMo Framework", Retrieved from https://www.youtube.com/watch?v=gTwLLhebOcQ, Retrieved on Aug. 26, 2024, pp. 1-2.

(Continued)

*Primary Examiner* — Thu N Nguyen
(74) *Attorney, Agent, or Firm* — Invoke

(57) ABSTRACT

Techniques for filtering queries to a large language model (LLM) based on their relevance to an enterprise domain associated with the LLM involve training a machine learning model using historical LLM query data and associated relevance scores. These scores indicate how closely a query relates to the enterprise's operations. The trained model is then applied to new input queries, generating relevance scores for the input queries. Queries meeting a predetermined relevance threshold are passed to the LLM for processing. For queries falling below this threshold, remedial actions are taken instead of processing by the LLM. The techniques optimize computational resource allocation by prioritizing queries relevant to the enterprise while filtering out less pertinent ones. The techniques create a relevance-based gatekeeping mechanism for LLM query processing, enhancing efficiency and focusing the LLM's capabilities on enterprise-specific tasks.

20 Claims, 5 Drawing Sheets

(56) References Cited

OTHER PUBLICATIONS

"Guard", Retrieved from https://docs.guardrailsai.com/concepts/guard/, Oct. 31, pp. 5.
"Harness LLMs with GenAI agents for effective enterprise use", Retrieved from https://www.tcs.com/what-we-do/pace-innovation/article/generative-ai-guardrails-secure-llm-usage, Oct. 31, 2023, pp. 12.
"NVIDIA NeMo", Retrieved from https://www.nvidia.com/en-in/ai-data-science/products/nemo/, Retrieved on Aug. 26, 2024, pp. 1-10.
"Validators", Retrieved from https://www.guardrailsai.com/docs/concepts/validators, Oct. 31, 2023 pp. 4.
"What is Guardrails?", Guardrails.ai, Oct. 31, 2023, p. 1.
Bird S., "Deploy large language models responsibly with Azure AI", Jul. 18, 2023, pp. 7.
Chockalingam et al., "NVIDIA Enables Trustworthy, Safe, and Secure Large Language Model Conversational Systems", Apr. 25, 2023, pp. 3.
Liu et al., "Adversarial Attacks on Large Language Model-Based System and Mitigating Strategies: A Case Study on ChatGPT", Security and Communication Networks, Jun. 10, 2023, vol. 2023, Article ID 8691095, pp. 1-10.
Naveed et al., "A Comprehensive Overview of Large Language Models", Oct. 5, 2023, pp. 1-37.
Vasserman L., "Reducing Toxicity in LargeLanguage Models with PerspectiveAPI", Apr. 22, 2023, pp. 5.

\* cited by examiner

LARGE LANGUAGE MACHINE LEARNING MODEL QUERY MANAGEMENT

INCORPORATION BY REFERENCE; DISCLAIMER

Each of the following applications are hereby incorporated by reference: Application No. 63/582,171 filed Sep. 12, 2023. The applicant hereby rescinds any disclaimer of claims scope in the parent application(s) or the prosecution history thereof and advises the USPTO that the claims in the application may be broader than any claim in the parent application(s).

BACKGROUND

The present disclosure relates to managing queries to large language models (LLMs). In particular, the present disclosure relates to applying a machine learning model to input queries destined for LLMs to determine if the queries are relevant to a particular enterprise.

A large language machine learning model, sometimes referred to as just a large language model (LLM), is a type of machine learning model designed to understand and generate human-like text. While many modern LLMs use transformer architectures with attention mechanisms, there are various architectures in use. The scale of these models can vary significantly, with some containing millions of parameters and others reaching into the billions or even trillions. LLMs are trained on large datasets that can range from gigabytes to multiple terabytes of text, depending on the model's size and purpose. These datasets often include diverse sources, such as books, articles, websites, and other text corpora. LLMs are typically designed to process and generate natural language, making them versatile tools for a wide range of text-based tasks. Users can input questions or prompts on various topics to receive generated responses from the LLM. However, these models can be resource intensive, often requiring substantial computational power, including multiple central processing unit (CPU) cores and graphics processing units (GPUs) to run effectively. In large enterprises, LLM queries that are unrelated to the organization's operations can tie up computing resources that might be needed for more relevant processes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

One or more embodiments of the present disclosure are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
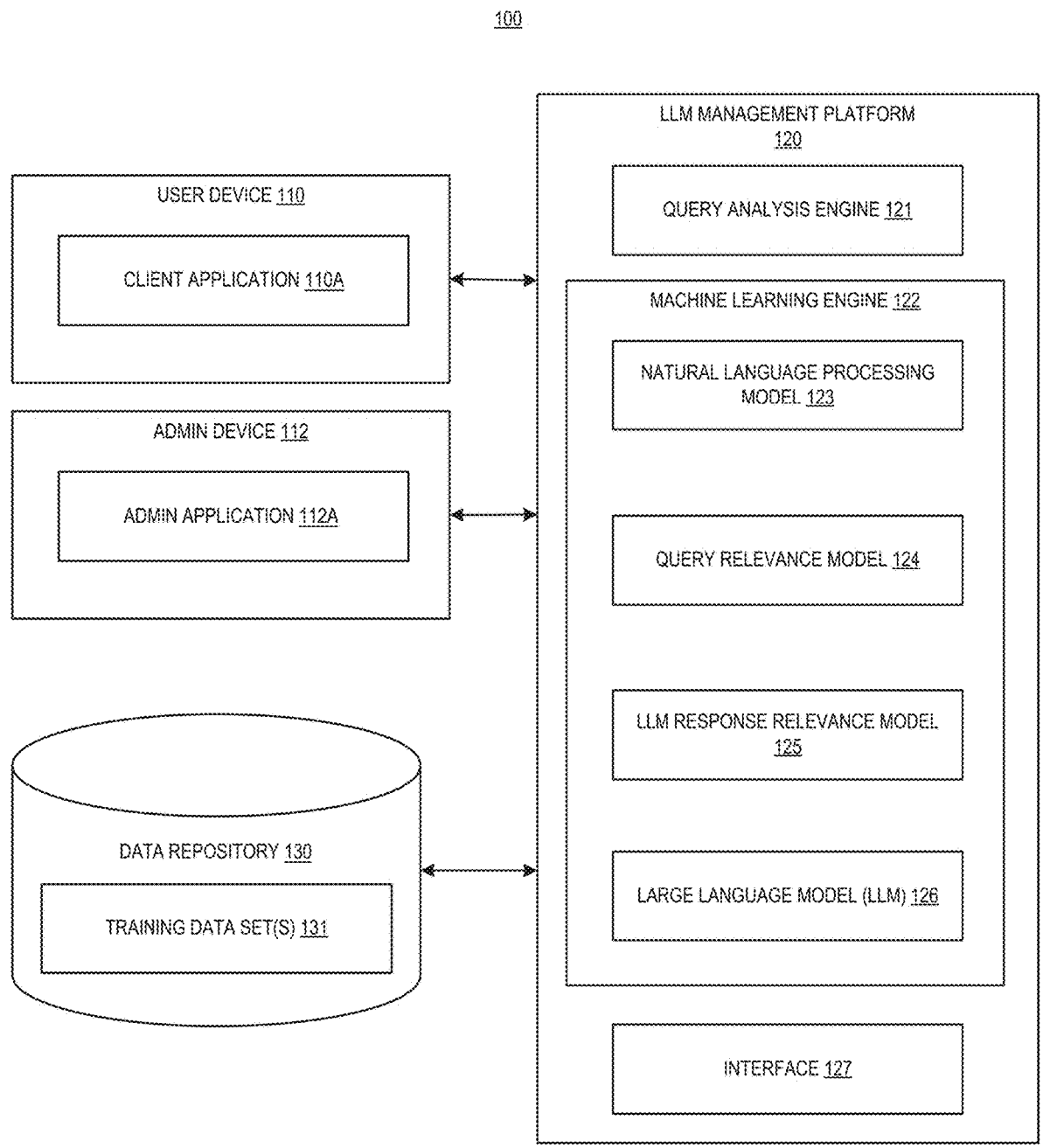
FIG. 1 illustrates a system for LLM query management in accordance with an embodiment.

In the following detailed description, for the purposes of explanation, numerous specific details are set forth to aid understanding of one or more embodiments of the present disclosure. In some instances, an embodiment of the present disclosure may be practiced without one or more of these specific details. In some cases, a described feature of one embodiment of the present disclosure is also a feature of one or more other embodiments of the present disclosure even though the feature is not expressly described with respect to the one or more other embodiments. In some embodiments, well-known structures and devices are shown in the figures in block diagram form to avoid unnecessarily obscuring the embodiment.

1. GENERAL OVERVIEW
2. QUERY FILTERING SYSTEM
3. MANAGING INPUT QUERIES TO LLMS
4. COMPUTER NETWORKS AND CLOUD NETWORKS
5. MICROSERVICE APPLICATIONS
6. EXAMPLE LLM ARCHITECTURE
7. HARDWARE OVERVIEW
8. MISCELLANEOUS; EXTENSIONS; TERMINOLOGY

1. General Overview

An embodiment of the present disclosure applies a trained machine learning model to filter queries being submitted to a large language model (LLM) based on relevance of the queries to a set of topics associated with the LLM. The set of topics may be associated with a particular entity that implements the LLM such as an enterprise. The set of topics may be associated with an enterprise domain corresponding to either a portion of the enterprise or the entirety of the enterprise.

An embodiment of the present disclosure trains a machine learning model to generate a relevance score for a query in relation to an LLM implemented by an enterprise based on the query's attributes. For example, a query directed to entertainment may have very little relevance to an LLM implemented by a pharmaceutical company. The pharmaceutical company may limit processing resources applied to irrelevant queries by filtering employees' queries before they are allowed to be sent to the LLM. If the ML-model-generated relevance score meets a threshold value, the system passes the query through to the LLM to generate a response. If the relevance score does not meet the threshold value, the system takes remedial action. For example, the system may refrain from passing the query through to the LLM. Additionally, or alternatively, the system may generate a notification to a user or an administrator indicating that the query appears to be irrelevant to the enterprise.

An embodiment of the present disclosure trains a machine learning model with a data set, including queries and relevance scores for the queries, in relation to a particular enterprise. The machine learning model learns the attributes in the queries that result in the corresponding relevance scores. For example, the machine learning model may learn the attributes in the queries that are related to operations performed by employees in a particular enterprise associated with the LLM.

An embodiment of the present disclosure trains a machine learning model on a data set that includes (a) queries, (b) LLM responses to the queries, and (c) relevance scores. The machine learning model learns, from the attributes in the queries and LLM responses, (a) the LLM responses that include content relevant to an enterprise and (b) the query attributes that are likely to result in relevant content. The trained machine learning model may receive query attributes as input data to generate relevance scores for the queries.

An embodiment of the present disclosure implements a first machine learning model to generate a first relevance score for input queries to an LLM and a second machine learning model to generate a second relevance score based on responses generated by the LLM. The system may implement the first machine learning model to filter input queries to the LLM by comparing the first relevance scores to a threshold value. When the system passes the queries through to the LLM and the LLM generates responses, the system applies the second machine learning model to (a) the query and (b) the LLM response to generate the second relevance score. The system may generate training data sets based on the input queries and the second relevance scores to re-train the first machine learning model.

One or more embodiments described in this Specification and/or recited in the claims may not be included in this General Overview section.

2. Query Filtering System

FIG. 1 illustrates a system 100 in accordance with an embodiment of the present disclosure. As illustrated in FIG. 1, system 100 includes user device 110, admin device 112, a large language model (LLM) management platform 120, and a data repository 130.

In an embodiment, the system 100 includes more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

One or more additional embodiments relating to computer networks are described below in Section 4, titled "Computer Networks and Cloud Networks."

The LLM management platform 120 manages access by a user to the LLM 126. In an embodiment of the present disclosure, LLM management platform 120 refers to hardware and/or software configured to perform operations described herein for applying a machine learning model to a query to determine a relevance of the query to a particular enterprise. Examples of operations for managing queries to an LLM model are described below with reference to FIG. 2.

In an embodiment, LLM management platform 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In an embodiment, the LLM 126 is a deep learning machine learning model that combines a deep learning technique called attention in combination with a deep learning model type known as transformers to build predictive models. These predictive models encode and predict natural language writing.

However, LLM 126 can be implemented using various architectures other than the transformer-based model with attention mechanisms. One alternative is to use recurrent neural networks (RNNs) with long short-term memory (LSTM) or gated recurrent units (GRU) that can capture sequential dependencies in text without relying on attention mechanisms. Another approach is to implement convolutional neural networks (CNNs) for natural language processing tasks, leveraging their ability to capture local patterns and hierarchical structures in text. Other possibilities include the use of sparse attention mechanisms, such as the Reformer architecture, that reduce computational complexity by approximating attention. Memory-augmented neural networks, like differentiable neural computers (DNCs), offer another alternative by separating computation and memory, potentially allowing for more efficient processing of long-range dependencies. Mixture of Experts (MoE) models present yet another approach, where multiple "expert" networks specialize in different aspects of language processing, with a gating network determining the experts to use for a given input. Additionally, neural architecture search (NAS) techniques can be employed to automatically discover novel and efficient architectures tailored specifically for language modeling tasks. These alternative implementations can offer advantages in terms of computational efficiency, handling of long-range dependencies, or specialization for particular language tasks, depending on the specific requirements and constraints of the application.

In an embodiment, LLM 126 contains hundreds of billions of parameters trained on multiple terabytes of text. LLM 126 is trained to receive natural language as an input and generate a natural language output. LLM 126 is comprised of layers of attention mechanisms and neural networks that process input data in parallel. The layers of attention mechanisms and neural networks operating in parallel allow the LLM to learn complex patterns in text.

The attention mechanisms help neural networks learn the context of words in the sequences of words. An attention mechanism operates by breaking down a set of input data, such as a sentence or sequence of words or tokens, into keys, queries, and values. Keys represent elements of the input data that provide information about what to pay attention to. Queries represent elements of the input data that need to be compared with the keys to determine relevance. Values are elements of the input data that will be selected or weighted based on the attention scores. The attention mechanism calculates a similarity score between each query and key pair. This score reflects how relevant each key is to a given query. Various methods can be used to compute these scores, such as dot-product, scaled dot-product, or other custom functions. The similarity scores are then transformed into attention weights. For example, a system may transform the similarity scores using a softmax function. The softmax function adjusts the values of the similarity scores relative to each other such that the sum of the similarity scores is 1. Finally, the attention weights are used to take a weighted sum of the corresponding values. This weighted sum represents the model's focused or "attended" representation of the input data. In an embodiment of the present disclosure, the attention mechanisms are implemented using self-attention processes, scaled dot-product attention processes, and multi-head attention processes.

It should be noted that LLM 126 can be implemented with varying numbers of parameters and trained on different amounts of data, depending on the specific requirements and constraints of the application. On the smaller end of the spectrum, LLM 126 could be implemented as a compact model with millions to a few billion parameters. Smaller models can be trained on datasets ranging from a few gigabytes to hundreds of gigabytes. In addition, knowledge distillation or parameter-efficient fine-tuning techniques may be employed to maintain performance while reducing size. At the other end of the size spectrum, LLM 126 could be scaled up to contain trillions of parameters. These massive models may be trained on vast datasets, for example, exceeding 100 terabytes. The choice of model size and training data volume involves trade-offs between performance, computational resources, and specific task requirements. Larger models generally offer better performance and versatility but require more computational resources for training and inference. They can capture more complex patterns and generalize better to diverse tasks. Smaller models, while potentially less powerful, are more efficient in terms of memory usage and inference speed, making them suitable for deployment in resource-constrained environments or real-time applications. The amount of training data also impacts model performance, with larger datasets potentially leading to better generalization, but also increases the risk of biases present in the data being amplified in the model's outputs.

According to an embodiment, the LLM 126 receives a natural language prompt as input data and generates a sequence of words in natural language by predicting a next word, or sequence of words, based on the textual and grammatical patterns learned by the LLM 126 during training.

In an embodiment, a user device 110 runs a client application 110A to allow the user device 110 to access functions of the LLM management platform 120, including transmitting natural-language queries to the LLM 126 and receiving natural-language responses from the LLM 126.

In an embodiment, the client device 110 is a digital device that serves as the user interface point for interacting with the Large Language Model (LLM) management platform 120. It runs a client application 110A that facilitates access to the LLM 126's functions through the LLM management platform. This device can transmit natural-language queries to the LLM and receive natural-language responses. The client device 110 falls under the broader category of "digital devices" that are hardware devices containing a processor. These can be physical devices or virtual machines executing applications. Examples of potential client devices include computers (desktops, laptops, tablets), smartphones, Personal Digital Assistants (PDAs), smart TVs or set-top boxes, and IoT devices with sufficient processing power.

In an embodiment of the present disclosure, the client device 110 interacts with the LLM management platform 120 through an interface 127 that could be implemented as a GUI, CLI, haptic interface, or voice command interface. This interface renders various UI elements like checkboxes, buttons, text fields, etc., that allow users to input queries and receive responses. The client application 110A on the device manages these interactions, potentially handling tasks like query input, response display, and user feedback collection for relevance scoring.

In an embodiment of the present disclosure, the client application 110A is a software component running on the user device 110 designed to facilitate interaction between the user and the Large Language Model (LLM) management platform 120. It serves as an interface for users to access the functions of the LLM 126, including submitting natural-language queries and receiving responses. In an embodiment of the present disclosure, the application 110A implements some of the interface 127 as a GUI, CLI, haptic interface, or voice command interface, rendering various UI elements, such as text fields for query input, buttons for submission, and display areas for LLM responses.

The client application 110A may be implemented using various technologies depending on the device and platform. Examples include a web application using HTML5, CSS, and JavaScript, accessible through a web browser. Another example is a native mobile app for iOS or Android, developed using Swift/Objective-C or Java/Kotlin, respectively. Another example is a desktop application built with frameworks like Electron or Qt for cross-platform compatibility. Another example is a command-line interface tool for technical users, implemented in languages like Python or Go.

In an embodiment, the application 110A handles different tasks, such as user authentication, query preprocessing, response formatting, and local caching of frequently used information. It may also include features for providing feedback on query relevance and LLM responses that can be used to retrain and improve the machine learning models in the LLM management platform.

In an embodiment, admin device 112 serves as an administrative interface to the LLM management platform 120. This device 112 runs a variant 112A of the client application 110A that provides administrative functions or specialized features not available from the client application 110A at client device 110. Examples of such features include any of the following: read-only monitoring capabilities for system performance and query patterns; emergency override functions for critical situations; specialized analytics tools for deep diving into LLM response quality or relevance scoring accuracy; or a testing environment for proposed changes to relevance thresholds or scoring algorithms. Examples of the admin device 112 include any of the following: a mobile device for on-the-go monitoring and emergency actions; a dedicated hardware console in a secondary operations center; a virtual machine accessible through a secure VPN for remote administration; or a lightweight client on wearable tech for instant notifications and basic controls.

In an embodiment of the present disclosure, interface 127 refers to hardware and/or software configured to facilitate communications between a user device 110 and the LLM management platform 120. Interface 127 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment of the present disclosure, different components of interface 127 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, interface 127 is specified in one or more other languages, such as Java, C, or C++.

A query analysis engine 121 receives user-generated, natural-language queries intended for the LLM 126. The query analysis engine 121 applies a natural-language processing (NLP) model 123 to encode the query for the query relevance machine learning model 124. The NLP model 123 extracts features from the natural language query to convert the query into a vector. In an embodiment of the present disclosure, the NLP model 123 utilizes one or more of Word2Vec, GloVe, FastText, and term frequency-inverse document frequency (TF-IDF) processes to encode the query as a vector. The NLP model 123 is structured with one or more deep-learning structures, including recurrent neural networks (RNNs), long short-term memory (LSTM) networks, transformers, and convolutional neural networks (CNNs).

The query analysis engine 121 provides the vector, corresponding to the encoded query, to the query relevance machine learning model 124. The query relevance machine learning model 124 generates a first relevance score associated with the query. The LLM management platform 120 performs one or more remedial actions based on the first relevance score. For example, if the first relevance score meets a threshold, the LLM management platform 120 provides the query to the LLM 126. If the first relevance score does not meet the threshold, the LLM management platform 120 may either (a) refrain from providing the query to the LLM 126 or (b) provide the query to the LLM 126 while performing one or more additional actions.

For example, the LLM management platform 120 may generate a notification to one or both client application 110A and admin application 112A, indicating that the query did not meet a relevance threshold. In an embodiment, an administrator associated with the admin application 112A executing on the administrator device 112 may either authorize the LLM management platform 120 to pass the query to the LLM 126 or prevent the LLM management platform 120 from passing the query to the LLM. In an embodiment of the present disclosure, the LLM management platform 120 checks an authorization level of a user associated with the client application 110A to determine whether or not to pass the query to the LLM 126.

In an embodiment of the present disclosure, the machine learning engine 122 receives feedback based on query responses generated by the LLM 126 to retrain the ML model 124. A user associated with the client application 110A may provide the feedback. For example, the user may indicate that a particular LLM response was not relevant to an enterprise, and that the corresponding relevance score for the query should be lower than the score generated by the model 124.

In an embodiment of the present disclosure, the query analysis engine 121 is a component of the LLM management platform 120, designed to process and evaluate user-generated natural language queries intended for the LLM 126. A function is to determine the relevance of incoming queries to the enterprise's operations. The engine employs at least two components, (1) a natural language processing (NLP) model 123 and (2) a query relevance machine learning model 124.

In an embodiment of the present disclosure, the NLP model 123 serves as the first stage of processing, encoding the natural language query into a vector representation. This model utilizes various techniques such as Word2Vec, GloVe, FastText, or TF-IDF to extract features from the query. The NLP model's architecture incorporates deep learning structures, like recurrent neural networks (RNNs), long short-term memory (LSTM) networks, transformers, and/or convolutional neural networks (CNNs). Once the query is encoded, the vector representation is passed to the query relevance machine learning model 124.

In an embodiment, the query relevance model 124 generates a relevance score for the query that is used to determine if the query should be forwarded to the LLM 126 or if remedial actions should be taken. Examples of how the query analysis engine 121 might process queries include any of the following: a query about pharmaceutical research might receive a high relevance score for a pharmaceutical company's LLM; a query about entertainment news might receive a low relevance score for a financial services company's LLM; or a query using technical jargon specific to the enterprise's field would likely be scored as highly relevant. The query analysis engine 121 functions as an intelligent filter, ensuring that the LLM 126 primarily handles queries that are relevant to the enterprise's operations, thereby optimizing resource utilization and maintaining focus on business-critical interactions.

In an embodiment of the present disclosure, the natural-language processing (NLP) model 123 is a component of the query analysis engine 121 within the LLM management platform 120 that functions to encode user-generated natural language queries into vector representations that can be processed by the query relevance machine learning model 124. The NLP model 123 employs techniques to extract features from the natural language input and convert the features into a numerical format suitable for machine learning analysis. Features and techniques of the NLP model 123 may include any of the following: state-of-the-art text encoding techniques including Word2Vec, GloVe, FastText, and TF-IDF to capture semantic relationships between words and represent them in a high-dimensional vector space; recurrent neural networks (RNNs) capable of processing sequential data and capturing context over time; long short-term memory (LSTM) networks utilized to learn long-term dependencies in text; attention-based transformers; or convolutional neural networks (CNNs) employed for text classification and feature extraction.

For example, for the query "What are the side effects of aspirin?", the model 123 might use Word2Vec to encode individual words and an LSTM to capture the sequence and context, resulting in a vector that represents the medical nature of the query. As another example, given a technical query like "Explain the process of protein folding", the model 123 might employ a transformer architecture to understand the scientific context and generate a vector representation that captures the complexity of the topic. Yet another example, for a multi-part query, such as "Compare the market trends of electric vehicles in the US and China", the model 123 could use a combination of CNNs for feature extraction and RNNs to capture the relational aspects of the query components.

In an embodiment of the present disclosure, the machine learning engine 122 is a component of the LLM management platform 120, designed to manage and improve the query relevance assessment process. It encompasses multiple machine learning models and algorithms, primarily focusing on generating and refining relevance scores for LLM queries. Functions and features of the machine learning engine 122 may include any of the following: the machine learning engine 122 continuously improving relevance assessments by retraining the query relevance model 124 based on feedback received from LLM-generated query responses; the engine 122 employing a dual model approach, where the engine uses a secondary model 125 to analyze LLM responses and generate a second relevance score that is then used to validate and potentially update the primary query relevance model 124; or the engine 122 automatically generating new training data to refine and improve the primary model's accuracy when discrepancies between the two models' scores exceed a predefined threshold.

In an embodiment of the present disclosure, the engine 122 employs machine learning algorithms, including any of the following: linear regression, logistic regression, decision trees, naïve Bayes, k-nearest neighbors, support vector machines, random forests, and neural networks. To process inputs, the engine 122 handles different variables, such as words, tokens, phrases, and patterns found in both user queries and LLM-generated responses. Examples of the machine learning engine's operations include any of the following: adjusting the relevance score for queries about "drug interactions" higher for a pharmaceutical company's LLM after receiving positive feedback on such queries; generating new training data when the secondary model consistently scores financial analysis queries higher than the primary model for a fintech company's LLM; or implementing a random forest algorithm to classify queries into relevance categories based on token patterns and phrase structures. The machine learning engine 122 functions as the adaptive intelligence behind the query filtering system, continuously evolving to improve the accuracy and efficiency of the LLM management platform.

In an embodiment of the present disclosure, the query relevance model 124 is a component of the LLM management platform 120 within the query analysis engine 121. The model 124 functions to generate a relevance score for each input query, determining how closely the query aligns with the enterprise's operations or areas of interest. This model 124 operates in conjunction with the NLP model 123 that provides it with encoded vector representations of the queries.

Aspects of the query relevance model 124 include any of the following: the model 124 processing input by accepting vector representations of queries from the NLP model 123 that encapsulate the semantic and contextual information of the original natural language queries; the model 124 generating relevance scores within a specific range (e.g., 0 to 1) based on the vector representations, representing the mode 124's assessment of how relevant the query is to the enterprise's domain; the model 124 employing threshold-based decision making, comparing the generated relevance score against a predefined threshold to determine if queries should be passed to the LLM 126 for processing or trigger remedial actions; the model 124 being retrained based on feedback from query responses and user interactions, allowing the model 124 to adapt and improve its relevance assessments over time; or the model 124 implementing feature importance by assigning different weights to various aspects of the input vectors, learning the query characteristics that are most indicative of relevance to the enterprise.

Some possible examples of how the query relevance model 124 could operate include, for a pharmaceutical company, a query about "recent advancements in cancer treatment" might receive a high relevance score (e.g., 0.95), easily passing the threshold for processing by the LLM. In contrast, for the same company, a query about "best restaurants in New York" might receive a very low relevance score (e.g., 0.02), triggering a remedial action rather than being passed to the LLM. As another example, a query about "drug interactions with grapefruit" might initially receive a moderate score (e.g., 0.60). If this query leads to valuable interactions and positive feedback, the model 124 may be retrained to assign higher relevance scores to similar queries in the future. The query relevance model 124 thus operates as a gatekeeper, ensuring that the LLM 126 primarily processes queries that are likely to be relevant and valuable to the enterprise, optimizing resource utilization and maintaining focus on domain-specific interactions.

In an embodiment of the present disclosure, the LLM response relevance model 125 is a secondary machine learning model within the LLM management platform 120 designed to evaluate the relevance of responses generated by the LLM 126. This model 125 serves as a quality control mechanism, providing an additional layer of relevance assessment beyond the initial query filtering performed by the query relevance model 124.

In an embodiment of the present disclosure, features and functions of the LLM response relevance model 125 include the model 125 taking as input both the original query and the LLM-generated response in vector form after processing by the NLP model 123. The model 125 generates a second relevance score based on the analysis of the query-response pair, assessing how well the response aligns with the enterprise's domain and the original query's intent. The model 125's score is compared with the initial relevance score from model 124, allowing the system to identify discrepancies in relevance assessment. When the discrepancy between the two models' scores exceeds a threshold (e.g., 5%), the system generates new training data to refine the query relevance model 124. By analyzing both queries and responses, this model 125 contributes to the ongoing improvement of the entire query management system. In an embodiment of the present disclosure, the model 125 is trained on datasets comprising queries, LLM-generated responses, and relevance scores, allowing it to learn relationships between query attributes, response attributes, and relevance.

Some examples of how the LLM response relevance model 125 operates in various settings are described. For example, if a financial services company receives a query about "stock market trends" resulting in a high initial relevance score but the LLM response discusses unrelated topics, model 125 might assign a low relevance score, triggering a system review. In a technology company, a query about "future of AI" might receive a moderate initial relevance score, but if the LLM provides a comprehensive, company-specific response, model 125 could assign a higher relevance score, potentially adjusting future assessments of similar queries. For a healthcare provider, if a query about "patient data management" receives a high relevance score and the LLM response is both relevant and aligned with the company's practices, model 125 would likely confirm the high relevance, reinforcing the system's decision to process such queries. The LLM response relevance model 125 thus operates as a feedback mechanism, ensuring the ongoing accuracy and relevance of the LLM's outputs while continuously refining the query filtering process.

In an embodiment, the LLM management platform 120 applies a second machine learning model 125 to the query response generated by the LLM 126 to generate a second relevance score. The LLM management platform 120 generates a set of training data 131 based on the second relevance score.

In an embodiment, if the second relevance score varies from the initial relevance score, the LLM management platform 120 generates a new set of training data 131 for retraining the query relevance machine learning model 124. In other words, the LLM management platform 120 applies a first machine learning model 124 to an LLM input query to generate a first relevance score. If the first relevance score meets a first threshold, the LLM management platform 120 passes the LLM input query to the LLM 126, generating the query response. The LLM management platform 120 applies the second machine learning model 125 to the query response (after encoding the query response by the NLP 123, for example) to generate a second relevance score. If the second relevance score-based on the query response-varies from the first relevance score by more than a threshold amount (e.g., 5% or more), the LLM management platform 120 generates a new training document to train the first machine learning model 124. The training document includes (a) the input query and (b) the second relevance score generated by the second machine learning model.

In an embodiment in which the LLM management platform 120 applies the second machine learning model 125 to the query response, the LLM management platform 120 may train the second machine learning model 125 on a data set comprising (a) queries, (b) LLM-generated query responses associated with the respective queries, and (c) relevance scores. The second machine learning model 125 may learn, in training, the relationships among query attributes, query response attributes, and relevance scores. In other words, the second machine learning model 125 may learn in training the query content that corresponds to relevant query responses.

In an embodiment, one or more elements of the machine learning engine 122 use a machine learning algorithm to manage queries to an LLM model by generating relevance scores corresponding to the queries. A machine learning algorithm is an algorithm that can be iterated to learn a target model f that best maps a set of input variables to an output variable using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables. For example, input variables associated with the query relevance machine learning model 124 include words, tokens, phrases, and patterns of words, tokens, and phrases in LLM queries. Input variables associated with the LLM response relevance machine learning model 125 include words, tokens, phrases, and patterns of words, tokens, and phrases in both LLM queries and LLM-generated responses to queries. The associated labels are associated with the output variable (e.g., relevance scores) of the target model f. The training data may be updated based on, for example, feedback on the accuracy of the current target model f. Updated training data is fed back into the machine learning algorithm that in turn updates the target model f.

In an embodiment, a machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a data repository 130 is any type of storage unit and/or device (e.g., a file system, database, collection of tables, or any other storage mechanism) for storing data. Furthermore, a data repository 130 may include multiple different storage units and/or devices. The multiple different storage units and/or devices may or may not be of the same type or located at the same physical site. Furthermore, a data repository 130 may be implemented or executed on the same computing system as the LLM management platform 120. Additionally, or alternatively, a data repository 130 may be implemented or executed on a computing system separate from LLM management platform 120. The data repository 130 may be communicatively coupled to the LLM management platform 120 via a direct connection or via a network.

Information describing training data sets 131 may be implemented across any of components within the system 100. However, this information is illustrated within the data repository 130 for purposes of clarity and explanation.

3. Managing Input Queries to LLMS

Figure 2:
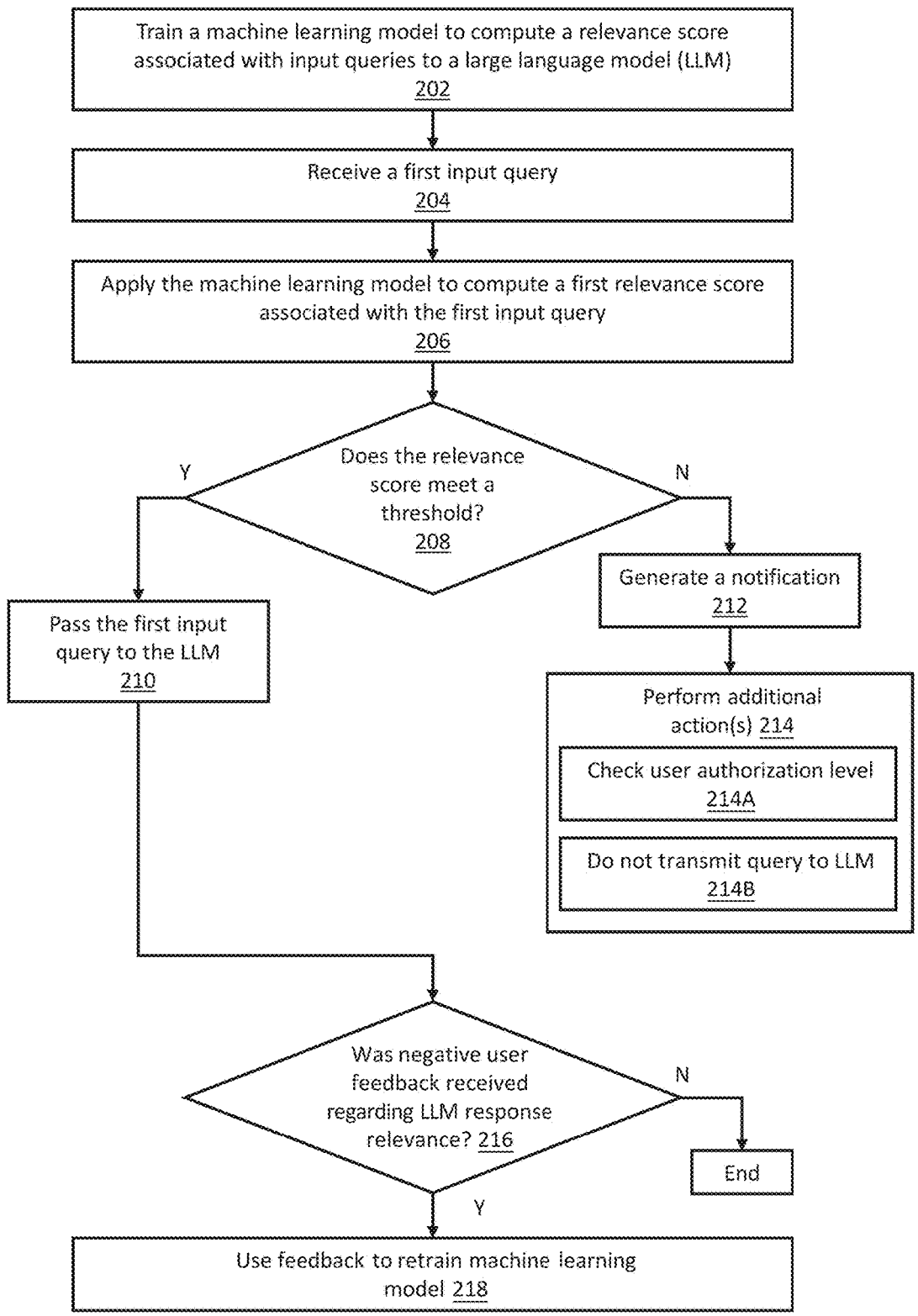
FIG. 2 illustrates an example set of operations for managing input queries to an LLM in accordance with an embodiment.

FIG. 2 illustrates an example set of operations for managing input queries to LLM-type machine learning models in accordance with an embodiment of the present disclosure. One or more operations illustrated in FIG. 2 may be modified, rearranged, or omitted. Accordingly, the particular sequence of operations illustrated in FIG. 2 should not be construed as limiting the scope of an embodiment of the present disclosure.

Figure 3:
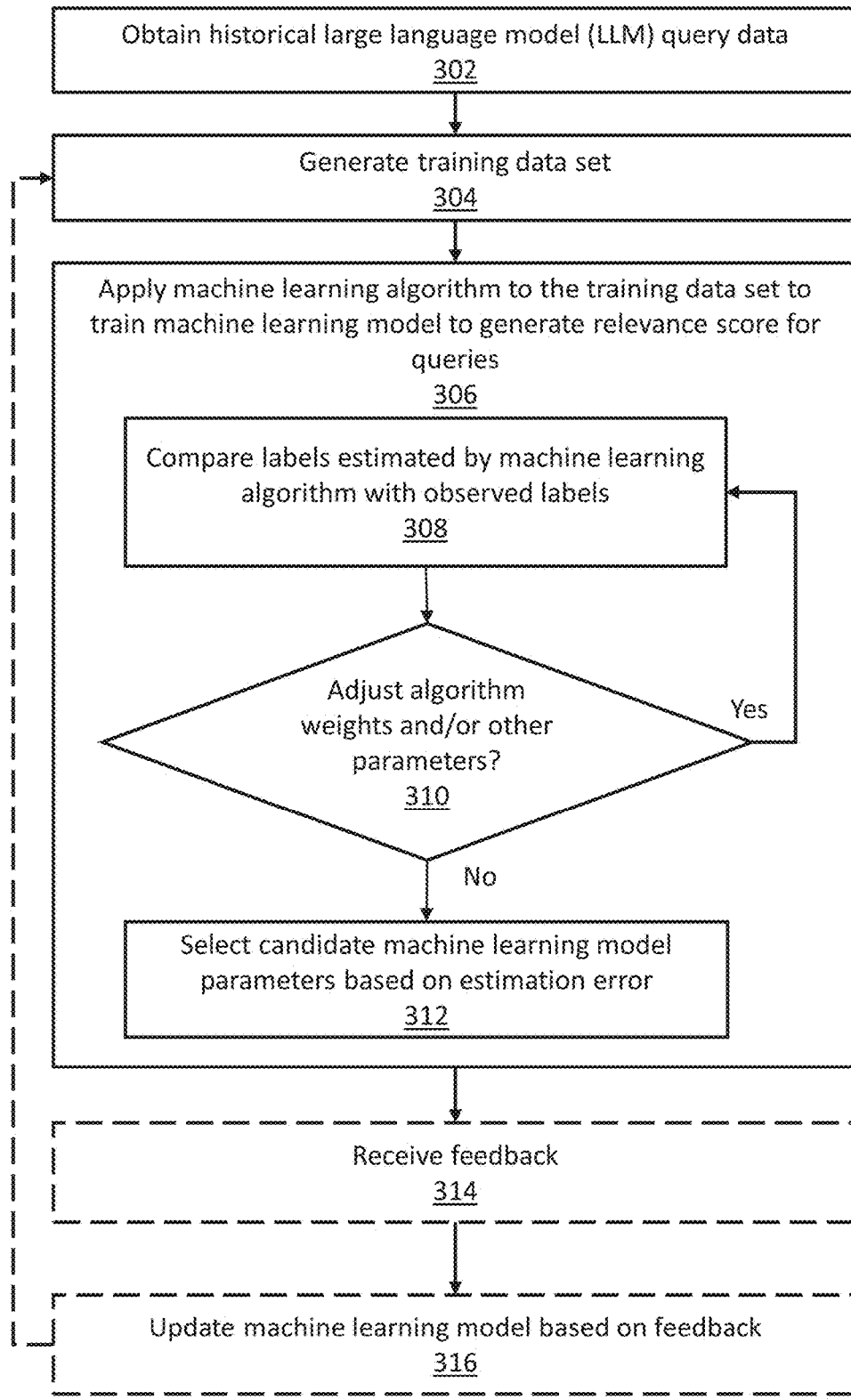
FIG. 3 illustrates an example set of operations for training a machine learning model to generate relevance scores associated with input queries to an LLM in accordance with an embodiment.

A system trains a machine learning model to compute a relevance score associated with an input query to a large language model (LLM) (Operation 202). An example of a process for training a machine learning model to compute the relevance score is described with respect to FIG. 3.

The system obtains historical LLM query data (Operation 302). The query data includes, at least, the words and phrases submitted as queries to an LLM. The system may also obtain artificially generated (e.g., synthetically generated) query data. For example, a user may generate synthetic queries or words and phrases that were not actually submitted as queries to an LLM but that the system may use to train a machine learning model.

Based on the historical LLM query data, the system generates a training data set (Operation 304). Training documents in the training data set include at least (a) a query and (b) a relevance score associated with the query. In an embodiment of the present disclosure, the relevance score represents how closely related topics in the query are to operations of an enterprise. For example, a company that sells electronics equipment may assign high relevance scores to queries that include topics related to the electronics and sales industries and low relevance scores to queries that include other topics, such as entertainment, travel, culinary, health, etc.

In an embodiment of the present disclosure, the training documents include a query and relevance score, without including information about a query response generated by the LLM. In an alternative embodiment, the training documents include the query data, relevance score data, and query response data associated with the query response generated by the LLM. In an example in which the training documents do not include query response data, the machine learning model is trained to identify relationships between query attributes, such as words or other tokens and the relevance scores. In the example in which the training documents include query response data, the machine learning model is trained to identify relationships between query attributes, query response attributes, and relevance scores.

In an embodiment of the present disclosure, query attributes and query response attributes include words, numbers, sets of words, phrases, patterns of words, tokens, and patterns of tokens, including queries and LLM-generated query responses.

The system applies a machine learning algorithm to the training data set to train the machine learning model (Operation 306). For example, the machine learning algorithm may analyze the training data set to train neurons of a neural network with particular weights and offsets to associate particular query attributes with particular relevance score labels. The particular relevance score labels may include identifying particular features in the queries, such as words and sets of words that indicate particular topics.

In an embodiment of the present disclosure, the system iteratively applies the machine learning algorithm to a set of input data to generate an output set of labels, compares the generated labels to pre-generated labels associated with the input data, adjusts weights and offsets of the algorithm based on an error, and applies the algorithm to another set of input data. In some cases, the system may generate and train a candidate recurrent neural network model such as a long short-term memory (LSTM) model. With recurrent neural networks, one or more network nodes or "cells" may include a memory. A memory allows individual nodes in the neural network to capture dependencies based on the order in which feature vectors are fed through the model. The weights applied to a feature vector representing one expense or activity may depend on its position within a sequence of feature vector representations. Thus, the nodes may have a memory to remember relevant dependencies between different words and tokens in a sentence or paragraph. For example, a word in isolation may have a first set of weights applied by nodes as a function of the respective feature vector for word. However, if the word is immediately preceded by another type of word, then a different set of weights may be applied by one or more nodes based on the memory of the preceding word. In this case, a relevance score assigned to the word may be affected by other words in a phrase or sentence. Additionally, or alternatively, the system may generate and train other candidate models, such as support vector machines, decision trees, Bayes classifiers, and/or fuzzy logic models, as previously described.

In an embodiment, the system compares the labels estimated through the one or more iterations of the machine learning model algorithm with observed labels to determine an estimation error (Operation 308). The system may perform this comparison for a test set of examples that may be a subset of examples in the training dataset that were not used to generate and fit the candidate models. The total estimation error for a particular iteration of the machine learning algorithm may be computed as a function of the magnitude of the difference and/or the number of examples for which the estimated label was incorrectly predicted.

In an embodiment of the present disclosure, the system determines whether or not to adjust the weights and/or other model parameters based on the estimation error (Operation 310). Adjustments may be made until a candidate model that minimizes the estimation error or otherwise achieves a threshold level of estimation error is identified. The process may return to Operation 308 to make adjustments and continue training the machine learning model.

In an embodiment of the present disclosure, the system selects machine learning model parameters based on the estimation error meeting a threshold accuracy level (Operation 312). For example, the system may select a set of parameter values for a machine learning model based on determining that the trained model has an accuracy level for predicting labels for medical claims of at least 98%.

Additionally, or alternatively, the system may train other types of machine learning models. For example, the system may adjust the boundaries of a hyperplane in a support vector machine or node weights within a decision tree model to minimize estimation error. Once trained, the machine learning model may be used to estimate labels for new natural language queries.

In an embodiment of the present disclosure in which the machine learning algorithm is a supervised machine learning algorithm, the system obtains feedback on the various aspects of the analysis described above (Operation 314). For example, the feedback may affirm or revise relevance labels generated by the machine learning model. The machine learning model may indicate that a particular query is associated with a low relevance score label. The system may receive feedback indicating that the query should instead be assigned a higher relevance score label. Based on the feedback, the machine learning training set may be updated, thereby improving its analytical accuracy (Operation 316). Once updated, the system may further train the machine learning model by optionally applying the model to additional training data sets.

Returning to FIG. 2, upon training the machine learning model, the system receives an input query (Operation 204). For example, a user may generate a natural-language query directed to an LLM to cause the LLM to generate a query response.

The system applies the trained machine learning model to the query to compute a first relevance score associated with the query (Operation 206). In an embodiment of the present disclosure, the system applies a natural-language processor (NLP) to the query to convert the natural-language query into a vector that may be input to the machine learning model. The NLP includes one or more rule-based models and natural language machine learning models. The NLP outputs a vector representing the query that the system may input to the machine learning model to analyze the query attributes and generate the relevance score.

A natural language processor (NLP) for encoding a natural language query (e.g., a natural language query or a natural language response) as a vector can be implemented using various techniques and models. The NLP is designed to convert natural language queries into vector representations that can be used as input for machine learning models. This text embedding process can be achieved through several methods. One approach is to use pre-trained word embedding models, such as Word2Vec, GloVe, or FastText, that map individual words to dense vector representations. For more context-aware representations, transformer-based models like BERT (Bidirectional Encoder Representations from Transformers) or its variants can be employed. These models generate contextual embeddings for each token in the input text. To handle out-of-vocabulary words and capture subword information, techniques like byte-pair encoding (BPE) or WordPiece tokenization can be integrated. For capturing document-level semantics, methods like Doc2Vec or averaging/pooling of word vectors can be used. The NLP pipeline may also include preprocessing steps, such as tokenization, lowercasing, and removing stop words or punctuation. Additionally, the system can incorporate rule-based models for specific tasks, like named entity recognition or part-of-speech tagging. The final vector representation produced by the NLP can be a concatenation or combination of various features extracted through these methods. The NLP captures syntactic, semantic, and contextual information from the input text and provides a rich numerical representation (e.g., an embedding) for the subsequent machine learning models to operate upon.

The system determines if the relevance score meets a relevance score threshold (Operation 208). For example, the relevance score may correspond to a range of values between 0 and 1. An entity may set a relevance score threshold according to operational considerations such as an amount of processing resources the entity is willing to commit to non-core topics. One entity may set a relevance score threshold to 0.82, so queries scoring less than 0.82 are flagged for further actions. Another entity may set a relevance score threshold at 0.5, so queries scoring less than 0.5 are flagged for further actions. Relevance score thresholds may also be represented as discrete numbers, such as 1, 2, 3, . . . 10, or A, B, and C.

If the system determines that the relevance score meets the relevance threshold, the system passes the query to the LLM to allow the LLM to generate a query response (Operation 210). In an embodiment of the present disclosure, the system passes the natural-language query to the LLM rather than the encoded vector generated by the NLP.

If the system determines that the relevance score does not meet the relevance score threshold, the system performs one or more remedial actions. For example, the system may generate a notification (Operation 212). The notification may be sent to the user who generated or submitted the query. Additionally, or alternatively, the notification may be sent to another user, such as a system or application administrator. The notification may include an indication that the query was not relevant to the enterprise. The notification may indicate that the query was not submitted to the LLM. The notification may indicate that the query is awaiting approval from an administrator prior to submitting the query to the LLM. In one example embodiment, the notification may include a feedback mechanism to allow a user to indicate if they believe the relevance score was in error. For example, if the user believes the query was relevant to their work at the enterprise, but the machine learning model generated a relevance score below the threshold relevance value, the user may select an interface element in the notification to provide feedback. The selection may initiate a feedback operation that causes the system to assign a higher relevance score to the query. Additionally, or alternatively, the system may send the query and the user selection to an administrator who may decide if the relevance score for the query needs to be modified. The system may retrain the machine learning model based on the revised relevance score assigned to the query.

In addition to generating a notification, the system may perform one or more additional actions (Operation 214). In an embodiment of the present disclosure, the system generates the notification to the user and/or administrator and transmits the query to the LLM. In an embodiment of the present disclosure, if the relevance score does not meet the relevance score threshold, the system does not transmit the query to the LLM (Operation 214B). In an embodiment of the present disclosure, the system checks a user's authorization level to determine whether or not to transmit a query to an LLM (Operation 214A). For example, a user with a higher authorization level may be permitted to transmit queries to an LLM that fall below the relevance score threshold. A user with a lower authorization level may not be permitted to transmit the same queries to the LLM.

The system determines if a user or machine learning model has provided negative feedback regarding the LLM's query response (Operation 216). For example, the system may determine that a particular query meets a relevance score threshold and may pass the query to the LLM. The LLM generates a query response, and the system provides the LLM-generated query response to the user. The user may determine that the query response is not relevant to an enterprise's operations. Accordingly, the user may provide feedback indicating that the query response was not relevant to the enterprise's operations. Based on the feedback, the system may (a) assign a lower relevance score to the query, (b) store the query and modified relevance score as training data, and (c) retrain the machine learning model based on the new training data (Operation 218).

In an embodiment of the present disclosure, the system may apply a second machine learning model to the LLM query response to generate a second relevance score. If the second relevance score varies from the initial relevance score, the system may generate a new set of training data for retraining the query-input machine learning model. In other words, the system applies a first machine learning model to an LLM input query to generate a first relevance score. If the first relevance score meets a first relevance score threshold, the system passes the LLM input query to the LLM, generating the query response. The system applies the second machine learning model to the query response (after encoding the query response by the NLP, for example) to generate a second relevance score. If the second relevance score—based on the query response—varies from the first relevance score by more than a threshold amount, the system generates a new training document to train the first machine learning model. The training document includes (a) the input query and (b) the second relevance score generated by the second machine learning model.

In an embodiment of the present disclosure in which the system applies the second machine learning model to the query response, the system may train the second machine learning model on a data set comprising (a) queries, (b) corresponding LLM-generated query responses, and (c) relevance scores. The second machine learning model may learn in training the relationships among query attributes, query response attributes, and relevance scores. In other words, the second machine learning model may learn in training the query content that corresponds to relevant query responses.

4. Computer Networks and Cloud Networks

In an embodiment of the present disclosure, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data. A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. Each node in an overlay network corresponds to a respective node in the underlying network. Hence, each node in an overlay network is associated with both an overlay address (to address the overlay node) and an underlying address (to address the underlying node that implements the overlay node). An overlay node may be a digital device and/or a software process (such as a virtual machine, an application instance, or a thread.) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment of the present disclosure, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently from each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In an embodiment of the present disclosure, in a multi-tenant computer network, tenant isolation is implemented to ensure that the applications and/or data of different tenants are not shared with one another. Various tenant isolation approaches may be used.

In an embodiment, each tenant is associated with a tenant ID. Each network resource of the multi-tenant computer network is tagged with a tenant ID. A tenant is permitted access to a particular network resource if the tenant and the particular network resources are associated with a same tenant ID.

In an embodiment, each tenant is associated with a tenant ID. Each application implemented by the computer network is tagged with a tenant ID. Additionally, or alternatively, each data structure and/or dataset stored by the computer network is tagged with a tenant ID. A tenant is permitted access to a particular application, data structure, and/or dataset only if the tenant and the particular application, data structure, and/or dataset are associated with a same tenant ID.

For example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates the tenants that have authorization to access specific applications. For each application, a list of tenant IDs of tenants authorized to access the application is stored. A tenant is permitted access to a particular application only if the tenant ID of the tenant is included in the subscription list corresponding to the particular application.

In an embodiment of the present disclosure, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. Microservice Applications

According to an embodiment of the present disclosure, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications that are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. Actions may be chained together to form recipes of actions that occur in optionally different applications that are otherwise unaware of or have no control or dependency on each other. These managed applications may be authenticated or plugged in to the microservices manager. For example, an application may be authenticated or plugged in to the microservices manager with user-supplied application credentials to the manager without requiring reauthentication each time the managed application is used alone or in combination with other applications.

In an embodiment of the present disclosure, microservices may be connected via a GUI. For example, microservices may be displayed as logical blocks within a window, frame, or another element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.).

Triggers

The techniques described above may be encapsulated into a microservice according to an embodiment of the present disclosure. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values. Additionally, or alternatively, the trigger condition can include absolute or relative thresholds for the amount or duration of data to analyze, so the trigger to the microservices manager occurs whenever a plugged-in microservice application detects that a threshold is crossed. For example, a user may request a trigger into the microservices manager when the microservice application detects a value has crossed a triggering threshold.

In an embodiment of the present disclosure, the trigger, when satisfied, might output data for consumption by the target microservice. In an embodiment of the present disclosure, the trigger, when satisfied, outputs a binary value indicating the trigger has been satisfied or outputs the name of the field or other context information for which the trigger condition was satisfied. Additionally, or alternatively, the target microservice may be connected to one or more other microservices, so an alert is input to the other microservices. Other microservices may perform responsive actions based on the above techniques, including, but not limited to, deploying additional resources, adjusting system configurations, and/or generating GUIs.

Actions

In an embodiment of the present disclosure, a plugged-in microservice application may expose actions to the microservices manager. The exposed actions may receive, as input, data or an identification of a data object or location of data, that causes data to be moved into a data cloud.

In an embodiment of the present disclosure, the exposed actions may receive, as input, a request to increase or decrease existing alert thresholds. The input might identify existing in-application alert thresholds and increase, decrease, or delete the threshold. Additionally, or alternatively, the input might request the microservice application to create new in-application alert thresholds. The in-application alerts may trigger alerts to the user while logged into the application or may trigger alerts to the user using default or user-selected alert mechanisms available within the microservice application itself rather than through other applications plugged into the microservices manager.

In an embodiment of the present disclosure, the microservice application may generate and provide an output based on input that identifies, locates, or provides historical data and defines the extent or scope of the requested output. The action, when triggered, causes the microservice application to provide, store, or display the output, for example, as a data model or as aggregate data that describes a data model.

6. Example LLM Architecture

Figure 4:
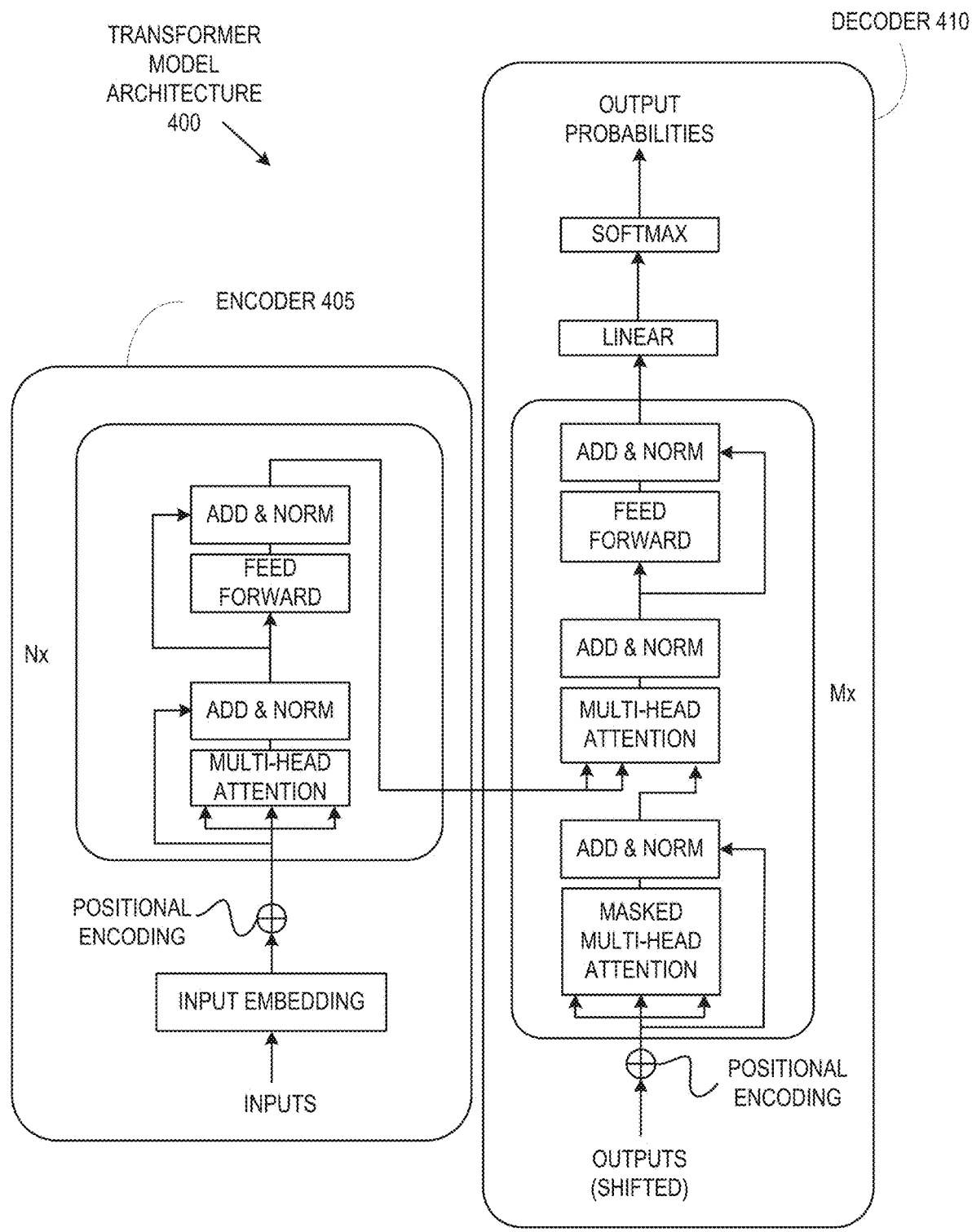
FIG. 4 illustrates an example transformer model architecture that may be used in an implementation of a LLM in accordance with an embodiment.

FIG. 4 illustrates an example transformer model architecture 400 that may be used in an implementation of a large language model (LLM), such as LLM 126 described above with respect to FIG. 1, according to an embodiment of the present disclosure.

The transformer model architecture 400 may be a neural network design for natural language processing. At its core, the transformer 400 may encompass an encoder 405 and a decoder 410, both leveraging self-attention mechanisms. The architecture 400 may begin with an input embedding layer that converts tokens into high-dimensional vector representations that may range, for example, from 128 to 1024 dimensions. These embeddings may be augmented with positional encodings to retain sequence order information.

The transformer 400 may include a multi-head, self-attention mechanism. This may allow the model 400 to simultaneously attend to different parts of the input sequence, capturing various types of relationships and dependencies. Each attention head may compute query, key, and value vectors, enabling the model to focus on relevant parts of the input when processing each token. Following the attention layers, the architecture 400 may incorporate feed-forward neural networks with multiple layers and non-linear activation functions.

A masked, multi-head attention mechanism in the decoder 410 of a transformer model 400 may be designed to prevent the model from attending to future tokens during sequence generation. In this mechanism, multiple attention heads may operate in parallel, each computing query (Q), key (K), and value (V) matrices from the input embeddings. The attention scores may be calculated as the dot product of Q and K, scaled by the inverse square root of the dimension of the keys. A lower triangular mask may be applied to these attention scores before softmax normalization, effectively setting the upper triangular elements to negative infinity. This masking may ensure that each position can only attend to previous positions in the sequence, maintaining the autoregressive property of the decoder. The masked attention scores may then be used to compute a weighted sum of the value vectors. The outputs from the heads may be concatenated and linearly transformed to produce the attention output. This process may allow the decoder to generate tokens sequentially while considering only the previously generated tokens, thus preserving the causal nature of language modeling.

To maintain stable training and mitigate vanishing gradients, the transformer 400 may employ layer normalization after each sub-layer (self-attention and feed-forward networks) and may introduce residual connections. These residual connections may allow unimpeded information flow through the network. The model may consist of multiple encoder and decoder layers stacked on top of each other, increasing its capacity to learn complex language patterns.

The output layer may involve a linear transformation followed by a softmax function, producing probability distributions over the vocabulary for text generation tasks. This architecture 400's design may allow for efficient parallel processing of input sequences, making it particularly suitable for handling the extensive datasets used in training LLMs.

7. Hardware Overview

According to one embodiment, the techniques described herein are implemented by one or more special-purpose computing devices. The special-purpose computing devices may be hard-wired to perform the techniques, or they may include digital electronic devices, such as one or more application-specific integrated circuits (ASICs), field programmable gate arrays (FPGAs), or network processing units (NPUs) that are persistently programmed to perform the techniques. Furthermore, the special-purpose computing devices may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices, or any other device that incorporates hard-wired and/or program logic to implement the techniques.

Figure 5:
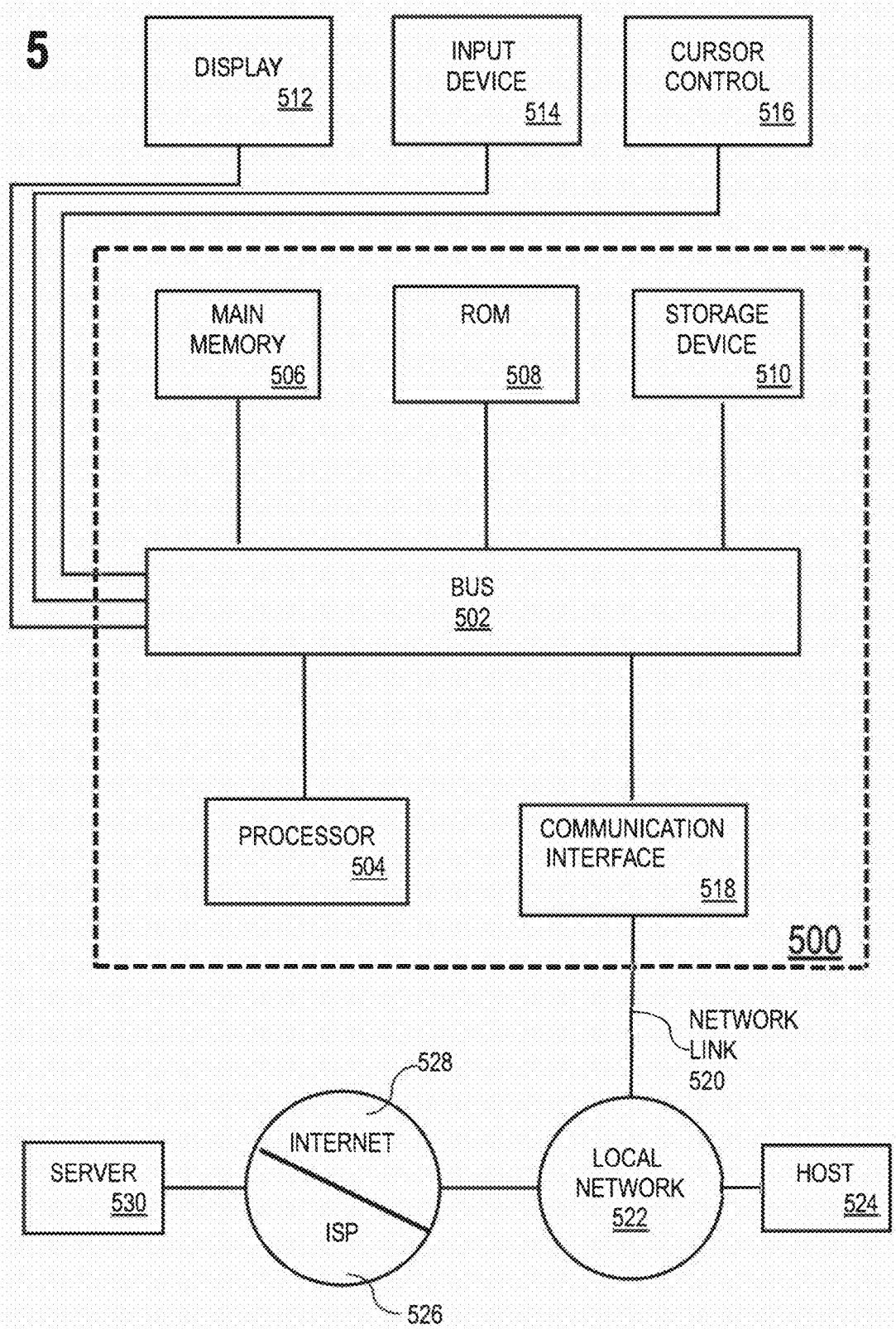
FIG. 5 shows a block diagram that illustrates a computer system for use in an implementation of LLM query management in accordance with an embodiment.

For example, FIG. 5 is a block diagram that illustrates a computer system 500 upon which an embodiment of the disclosure may be implemented. Computer system 500 includes a bus 502 or other communication mechanism for communicating information and one or more hardware processors 504 coupled with bus 502 for processing information. A hardware processor 504 may be, for example, a general-purpose microprocessor or a graphics processing unit (GPU). If computer system 500 has multiple hardware processors 504, then the hardware processors 504 may encompass the same or different types of hardware processors. For example, computer system 500 may encompass one or more central processing units (one or more CPUs) and one or more graphical processing units (one or more GPUs) that collectively process information (e.g., programmed instructions).

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allow the device to specify positions in a plane.

Computer system 500 may implement the techniques described herein using any of: customized hard-wired logic, one or more ASICs, one or more FPGAs, firmware, or program logic that, in combination with the computer system, causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 510. Volatile media includes dynamic memory such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. In turn, ISP 526 provides data communication services through the worldwide packet data communication network now commonly referred to as the "Internet" 528. Local network 522 and Internet 528 both use electrical, electromagnetic, or optical signals that carry digital data streams. The signals through the various networks as well as the signals on network link 520 and through communication interface 518, which carry the digital data to and from computer system 500, are example forms of transmission media.

Computer system 500 can send messages and receive data, including program code, through the network(s), network link 520, and communication interface 518. In the Internet example, a server 530 might transmit a requested code for an application program through Internet 528, ISP 526, local network 522, and communication interface 518.

The received code may be executed by processor 504 as it is received, and/or stored in storage device 510 or other non-volatile storage for later execution.

8. Miscellaneous; Extensions; Terminology

An embodiment of the present disclosure is directed to a system with one or more devices that include a hardware processor and that are configured to perform any of the operations described herein and/or recited in any of the claims below.

In an embodiment of the present disclosure, a non-transitory computer-readable storage medium comprises instructions that, when executed by one or more hardware processors, cause performance of any of the operations described herein and/or recited in any of the claims.

Unless the context clearly indicates otherwise, any combination of the features and functionalities described herein may be used in accordance with an embodiment of the present disclosure.

As used herein and in the appended claims, the term "computer-readable media" refers to one or more mediums or devices that store or transmit information in a format that a computer system accesses. Computer-readable media encompasses both storage media and transmission media. Storage media includes volatile and non-volatile memory devices such as RAM devices, ROM devices, secondary storage devices, register memory devices, memory controller devices, graphics memory devices, and the like. Transmission media includes wired and wireless physical pathways that carry communication signals such as twisted pair cable, coaxial cable, fiber optic cable, radio waves, microwaves, infrared, visible light communication, and the like.

As used herein and in the appended claims, the term "non-transitory computer-readable media" encompasses computer-readable media as just defined but excludes transitory, propagating signals. Data stored on non-transitory computer-readable media is not momentarily present and fleeting but has some degree of persistence. For example, instructions stored in a hard drive, an SSD, an optical disk, a flash drive, or other storage media are stored on non-transitory, computer-readable media. Conversely, data carried by a transient electrical or electromagnetic signal or wave is not stored in non-transitory, computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." Furthermore, the first and second devices may correspond to the same device or different devices.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, unless otherwise clear in context, phrases such as "a device configured to" are intended to include one or more recited devices. Such one or more recited devices, unless otherwise clear in context, are collectively configured to carry out the stated recitations. For example, "a processor configured to carry out recitations A, B and C" encompasses the following: (a) a single processor configured to carry out recitations A, B, and C, (b) multiple processors each configured to carry out recitations A, B, and C, and (c) a first processor configured to carry out recitation A working in conjunction with a second processor configured to carry out recitations B and C.

Unless otherwise clear in context, the terms "set," and "collection" should generally be interpreted to include one or more described items throughout this application. Accordingly, unless otherwise clear in context, phrases such as "a set of devices configured to" or "a collection of devices configured to" are intended to include one or more recited devices. Such one or more recited devices, unless otherwise clear in context, are collectively configured to carry out the stated recitations. For example, "a set of servers configured to carry out recitations A, B and C" encompasses both (a) a single server configured to carry out recitations A, B, and C; (b) multiple servers each configured to carry out recitations A, B, and C; and (c) a first server configured to carry out recitations A and B working in conjunction with a second server configured to carry out recitation C.

As used herein, unless otherwise clear in context, the term "or" is open-ended and encompasses infinite possible combinations, except where infeasible. For example, if it is stated that a component includes A or B, then, unless infeasible or otherwise clear in context, the component includes at least A, or at least B, or at least A and B. As a second example, if it is stated that a component includes A, B, or C then, unless infeasible or otherwise clear in context, the component includes at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. is either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical (e.g., a condition precedent) or causal connection or association between two stated things, where one of the things is the basis for or informs the other without requiring or foreclosing additional unstated things that affect the logical or casual connection or association between the two stated things.

Unless the context clearly indicates otherwise, the relational term "in response to" or "responsive to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

In the foregoing specification, one or more embodiments of the present disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer-readable media storing a set of instructions which, when executed by a set of one or more hardware processors, cause a set of one or more computing devices to perform:

obtaining a set of large language model (LLM) query data, the set of LLM query data comprising a set of queries previously input to a LLM;

generating a training data set based on the set of LLM query data, the training data set comprising a set of relevance scores for the set of queries previously input to the LLM, wherein a particular relevance score of the set of relevance scores represents how closely related a respective query of the set of queries previously input to the LLM is to an enterprise domain associated with the LLM;

training a machine learning model based on the training data set to yield a trained machine learning model;

receiving a first input query for input to the LLM;

applying the trained machine learning model to the first input query to determine a first relevance score for the first input query, wherein the first relevance score for the first input query represents how closely related the first input query is to the enterprise domain;

in response to determining that the first relevance score for the first input query meets a relevance score threshold, passing the first input query to the LLM;

presenting or transmitting a response to the first input query based on results outputted by the LLM that correspond to the first input query;

receiving a second input query for input to the LLM;

applying the trained machine learning model to the second input query to determine a second relevance score for the second input query, wherein the second relevance score for the second input query represents how closely related the second input query is to the enterprise domain; and in response to determining that the second relevance score for the second input query does not meet a relevance score threshold, performing a remedial action, wherein performing the remedial action comprises at least one of:

refraining from passing the second input query to the LLM;

generating a notification associated with the second input query, wherein the notification comprises at least one of: an indication that the second input query is not relevant to the enterprise domain, an indication that the second input query is not submitted to the LLM, an indication that the second input query is awaiting approval by an administrator prior to passing the second input query to the LLM, or a feedback mechanism that allows a user to indicate that the second relevance score determined for the second input query is in error; or checking a user authorization level to determine whether or not to transmit the second input query to the LLM.

2. The one or more non-transitory computer-readable media of claim 1, wherein the set of large language model (LLM) query data further comprises a set of artificially generated queries; wherein the training data set further comprises a set of relevance scores for the set of artificially generated queries; and wherein training the machine learning model is based on the set of artificially generated queries and the set of relevance scores for the set of artificially generated queries.

3. The one or more non-transitory computer-readable media of claim 1, wherein the set of large language model (LLM) query data further comprises a set of LLM-generated responses to the set of queries previously input to the LLM; wherein each relevance score of the set of relevance scores of the training data set further represents how closely related a respective LLM-generated response of the set of LLM-generated responses is to the enterprise domain; and wherein training the machine learning model is based on the set of LLM-generated responses.

4. The one or more non-transitory computer-readable media of claim 1, wherein the machine learning model comprises a neural network; wherein training the machine learning model comprises training the neural network based on the training data set to yield a trained neural network; and wherein the trained machine learning model comprises the trained neural network.

5. The one or more non-transitory computer-readable media of claim 1, wherein applying the trained machine learning model to the first input query comprises applying a natural-language processor to the first input query to convert the first input query into a vector representation that is input to the trained machine learning model; and wherein applying the trained machine learning model to the second input query comprises applying a natural-language processor to the second input query to convert the second input query into a vector representation that is input to the trained machine learning model.

6. The one or more non-transitory computer-readable media of claim 1, wherein performing a remedial action comprises generating a notification; and wherein the notification comprises at least one of: an indication that the second input query is not relevant to the enterprise domain, an indication that the second input query is not submitted to the LLM, an indication that the second input query is awaiting approval by an administrator prior to passing the second input query to the LLM, or a feedback mechanism that allows a user to indicate that the second relevance score determined for the second input query is in error.

7. The one or more non-transitory computer-readable media of claim 1, wherein performing a remedial action comprises checking a user authorization level to determine whether or not to transmit the second input query to the LLM.

8. The one or more non-transitory computer-readable media of claim 1, further storing a set of instructions which, when executed by a set of one or more hardware processors, cause a set of one or more computing devices to perform:

receiving an LLM-generated response in response to passing the second input query to the LLM, the LLM-generated response generated by the LLM;

receiving a feedback indicating that the LLM-generated response is not relevant to the enterprise domain;

based on receiving the feedback indicating that the LLM-generated response is not relevant to the enterprise domain, storing a training data item comprising the second input query and a relevance score for the second input query that is lower than the relevance score determined for the second input query by applying the trained machine learning model to the second input query; and training a machine learning model based on the training data item.

9. The one or more non-transitory computer-readable media of claim 1, further storing a set of instructions which, when executed by a set of one or more hardware processors, cause a set of one or more computing devices to perform:

receiving an LLM-generated response to the first input query in response to passing the first input query to the LLM, the LLM-generated response to the first input query generated by the LLM;

applying a second trained machine learning model to the LLM-generated response to the first input query to determine a relevance score for the LLM-generated response to the first input query;

based on the relevance score for the LLM-generated response to the first input query, storing a training data item comprising the first input query and a relevance score for the first input query that is lower than the relevance score determined for the first input query by applying the trained machine learning model to the first input query; and training a machine learning model based on the training data item.

10. A method comprising:

obtaining a set of large language model (LLM) query data, the set of LLM query data comprising a set of queries previously input to a LLM;

generating a training data set based on the set of LLM query data, the training data set comprising a set of relevance scores for the set of queries previously input to the LLM, wherein a particular relevance score of the set of relevance scores represents how closely related a respective query of the set of queries previously input to the LLM is to an enterprise domain associated with the LLM;

training a machine learning model based on the training data set to yield a trained machine learning model;

receiving a first input query for input to the LLM;

applying the trained machine learning model to the first input query to determine a first relevance score for the first input query;

in response to determining that the first relevance score for the first input query meets a relevance score threshold, passing the first input query to the LLM;

presenting or transmitting a response to the first input query based on results outputted by the LLM that correspond to the first input query;

receiving a second input query for input to the LLM;

applying the trained machine learning model to the second input query to determine a second relevance score for the second input query; and in response to determining that the second relevance score for the second input query does not meet a relevance score threshold, performing a remedial action, wherein performing the remedial action comprises at least one of:

refraining from passing the second input query to the LLM;

generating a notification associated with the second input query, wherein the notification comprises at least one of: an indication that the second input query is not relevant to the enterprise domain, an indication that the second input query is not submitted to the LLM, an indication that the second input query is awaiting approval by an administrator prior to passing the second input query to the LLM, or a feedback mechanism that allows a user to indicate that the second relevance score determined for the second input query is in error; or checking a user authorization level to determine whether or not to transmit the second input query to the LLM.

11. The method of claim 10, wherein:

the set of large language model (LLM) query data further comprises a set of artificially generated queries;

the training data set further comprises a set of relevance scores for the set of artificially generated queries; and the method further comprises training the machine learning model based on the set of artificially generated queries and the set of relevance scores for the set of artificially generated queries.

12. The method of claim 10, wherein:

the set of large language model (LLM) query data further comprises a set of LLM-generated responses to the set of queries previously input to the LLM;

each relevance score of the set of relevance scores of the training data set further represents how closely related a respective LLM-generated response of the set of LLM-generated responses is to the enterprise domain; and the method further comprises training the machine learning model based on the set of LLM-generated responses.

13. The method of claim 10, further comprising:

applying a natural-language processor to the first input query to convert the first input query into a vector representation, wherein applying the trained machine learning model to the first input query comprises inputting the vector representation of the first input query into the trained machine learning model; and applying a natural-language processor to the second input query to convert the second input query into a vector representation, wherein applying the trained machine learning model to the second input query comprises inputting the vector representation of the second input query into the trained machine learning model.

14. The method of claim 10, wherein performing a remedial action comprises generating a notification; and wherein the notification comprises at least one of: an indication that the second input query is not relevant to the enterprise domain, an indication that the second input query is not submitted to the LLM, an indication that the second input query is awaiting approval by an administrator prior to passing the second input query to the LLM, or a feedback mechanism that allows a user to indicate that the second relevance score for the second input query is in error.

15. The method of claim 10, wherein performing a remedial action comprises checking a user authorization level to determine whether or not to transmit the second input query to the LLM.

16. The method of claim 10, further comprising:

receiving an LLM-generated response in response to passing the second input query to the LLM, the LLM-generated response generated by the LLM; and receiving a feedback indicating that the LLM-generated response is not relevant to the enterprise domain;

based on receiving the feedback indicating that the LLM-generated response is not relevant to the enterprise domain, storing a training data item comprising the second input query and a relevance score for the second input query that is lower than the relevance score determined for the second input query by applying the trained machine learning model to the second input query; and training a machine learning model based on the training data item.

17. The method of claim 10, further storing a set of instructions which, when executed by a set of one or more hardware processors, cause a set of one or more computing devices to perform:

receiving an LLM-generated response to the first input query in response to passing the first input query to the LLM, the LLM-generated response to the first input query generated by the LLM;

applying a second trained machine learning model to the LLM-generated response to the first input query to determine a relevance score for the LLM-generated response to the first input query;

based on the relevance score for the LLM-generated response to the first input query, storing a training data item comprising the first input query and a relevance score for the first input query that is lower than the relevance score determined for the first input query by applying the trained machine learning model to the first input query; and training a machine learning model based on the training data item.

18. A system comprising:

a set of one or more hardware processors;

memory storing instructions which, when executed by the set of one or more hardware processors, cause the system to perform:
- obtaining a set of large language model (LLM) query data, the set of LLM query data comprising a set of queries previously input to a LLM;
- generating a training data set based on the set of LLM query data, the training data set comprising a set of relevance scores for the set of queries previously input to the LLM, wherein a particular relevance score of the set of relevance scores represents how closely related a respective query of the set of queries previously input to the LLM is to an enterprise domain associated with the LLM;
- training a machine learning model based on the training data set to yield a trained machine learning model;
- receiving a first input query for input to the LLM;
- applying the trained machine learning model to the first input query to determine a relevance score for the first input query;
- in response to determining that the relevance score for the first input query meets a relevance score threshold, passing the first input query to the LLM;
- presenting or transmitting a response to the first input query based on results outputted by the LLM that correspond to the first input query;
- receiving a second input query for input to the LLM;
- applying the trained machine learning model to the second input query to determine a relevance score for the second input query; and
- in response to determining that the relevance score for the second input query does not meet a relevance score threshold, performing a remedial action, wherein performing the remedial action comprises at least one of:
- refraining from passing the second input query to the LLM;
- generating a notification associated with the second input query, wherein the notification comprises at least one of: an indication that the second input query is not relevant to the enterprise domain, an indication that the second input query is not submitted to the LLM, an indication that the second input query is awaiting approval by an administrator prior to passing the second input query to the LLM, or a feedback mechanism that allows a user to indicate that the second relevance score determined for the second input query is in error; or
- checking a user authorization level to determine whether or not to transmit the second input query to the LLM.

19. The system of claim 18, wherein the set of large language model (LLM) query data further comprises a set of artificially generated queries; wherein the training data set further comprises a set of relevance scores for the set of artificially generated queries; and wherein training the machine learning model is based on the set of artificially generated queries and the set of relevance scores for the set of artificially generated queries.

20. The system of claim 18, wherein the set of large language model (LLM) query data further comprises a set of LLM-generated responses to the set of queries previously input to the LLM; wherein each relevance score of the set of relevance scores of the training data set further represents how closely related a set of one or more topics of a respective LLM-generated response of the set of LLM-generated responses are to the enterprise domain; and wherein training the machine learning model is based on the set of LLM-generated responses.

* * * * *